(12) United States Patent
Yang

(10) Patent No.: US 7,712,939 B2
(45) Date of Patent: May 11, 2010

(54) BACKLIGHT UNIT AND LIQUID CRYSTAL MODULE

(75) Inventor: Seung Hoon Yang, Daegu (KR)

(73) Assignee: LG Display Co., Ltd., Seoul (KR)

( * ) Notice: Subject to any disclaimer, the term of this patent is extended or adjusted under 35 U.S.C. 154(b) by 68 days.

(21) Appl. No.: 11/472,849

(22) Filed: Jun. 22, 2006

(65) Prior Publication Data
US 2007/0035950 A1   Feb. 15, 2007

(30) Foreign Application Priority Data
Aug. 9, 2005   (KR) .................. 10-2005-0072886

(51) Int. Cl.
A47F 3/00 (2006.01)
F21V 7/04 (2006.01)
F21V 29/00 (2006.01)
(52) U.S. Cl. ........................ 362/561; 362/580
(58) Field of Classification Search ........... 362/561, 362/580
See application file for complete search history.

(56) References Cited

U.S. PATENT DOCUMENTS

| | | | |
|---|---|---|---|
| 6,422,766 B1* | 7/2002 | Althaus et al. ............... 385/94 |
| 6,655,810 B2* | 12/2003 | Hayashi et al. ............. 362/600 |
| 7,126,741 B2* | 10/2006 | Wagner et al. ............... 359/290 |
| 7,252,408 B2* | 8/2007 | Mazzochette et al. ....... 362/294 |
| 7,275,851 B2* | 10/2007 | Sakurai ....................... 362/612 |
| 2002/0113534 A1* | 8/2002 | Hayashi et al. ............. 313/113 |
| 2002/0159265 A1* | 10/2002 | Rizkin et al. ................ 362/373 |
| 2004/0113044 A1* | 6/2004 | Ishiguchi ..................... 250/205 |
| 2005/0122065 A1* | 6/2005 | Young ......................... 315/294 |
| 2007/0081344 A1* | 4/2007 | Cappaert et al. ............ 362/373 |
| 2007/0115686 A1* | 5/2007 | Tyberghien ................. 362/580 |

FOREIGN PATENT DOCUMENTS

CN   1532613 A   9/2004
JP   2004-125837 A   4/2004

OTHER PUBLICATIONS

First Office Action for corresponding Chinese Patent Application Serial No. 200610083542.5, dated Sep. 28, 2007.

\* cited by examiner

*Primary Examiner*—Jacob Y Choi
*Assistant Examiner*—David J Makiya
(74) *Attorney, Agent, or Firm*—Brinks Hofer Gilson & Lione (57) ABSTRACT

A backlight unit is adapted for increasing the brightness uniformity and life span of a light source, and a liquid crystal module using the same. A light unit includes a light source; a temperature sensor for sensing a temperature of the light source; a peltier device for increasing and decreasing the temperature of the light source; and a controller for controlling the peltier device in correspondence to an output of the temperature sensor.

24 Claims, 6 Drawing Sheets

BACKLIGHT UNIT AND LIQUID CRYSTAL MODULE

This application claims the benefit of the Korean Patent Application No. P2005-0072886 filed on Aug. 9, 2006, which is hereby incorporated by reference.

FIELD

The present invention relates to a liquid crystal module, and more particularly to a backlight unit that is adaptive for increasing the brightness uniformity and life span of a light source, and a liquid crystal module using the same.

BACKGROUND

A CRT (cathode ray tube) is one of display devices which are generally used in a monitor of a measuring instrument, an information terminal etc. as well as a TV, but it cannot actively corresponds to the demand of making an electronic appliance small and light due to the CRT's own weight and size.

Accordingly, the display devices, which are expected to replace the CRT which has a certain limit in weight and size when various electronic appliances are on the trend of being made small and light, include a liquid crystal display LCD using an electric field optical effect, a plasma display panel PDP using a gas discharge, an organic light emitting diode OLED using an field effect luminous effect. Among them, the liquid crystal display device has actively been researched.

In order to replace the CRT, the liquid crystal display device having advantages such as compact size, light weight and low power consumption has recently been developed to act sufficiently as a flat panel display and is used in a monitor of a desktop computer and a large-size display device as well as a monitor of a notebook computer, thus the demand for the liquid crystal display device is continuously increasing.

The liquid crystal display device like this generally includes a liquid crystal module LCM, a drive circuit part for driving the liquid crystal module, and a case. And, the liquid crystal module includes a liquid crystal display panel where liquid crystal cells are arranged in amatrix shape, and a backlight unit which irradiates light to the liquid crystal display panel.

The liquid crystal display device not being a self-luminous display device needs a separate light source like a backlight unit. And the liquid crystal display device is divided into an edge type and a direct type in accordance with a location where the light source is installed.

The light source of the backlight unit can be a cold cathode fluorescent lamp CCFL, a hot cathode fluorescent lamp HCFL, an external electrode fluorescent lamp EEFL, a light emitting diode LED, etc, and the CCFL or the LED are mainly used among them.

Figure 1:
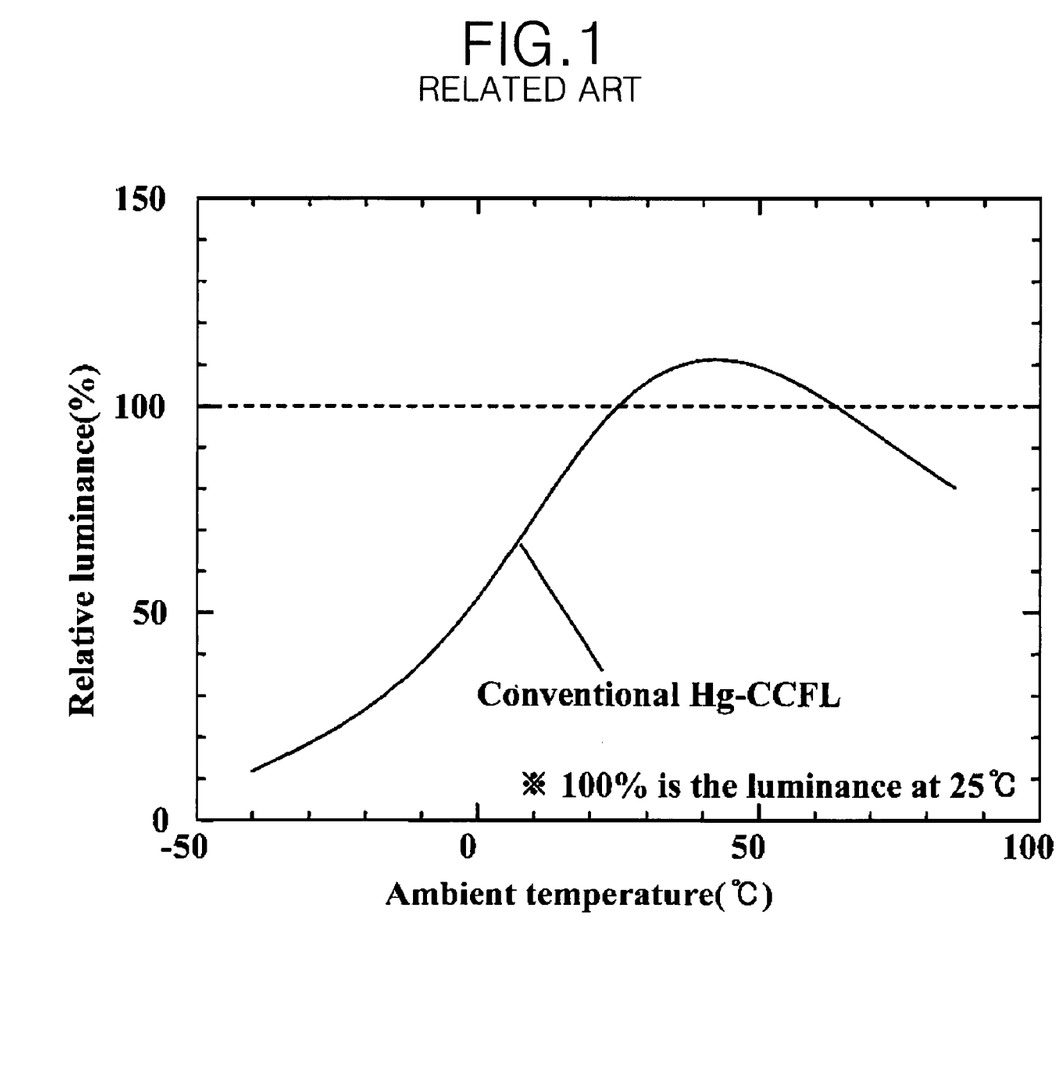
FIG. 1 is a diagram representing a brightness deterioration in accordance with a temperature of a cold cathode fluorescent lamp.
Figure 2:
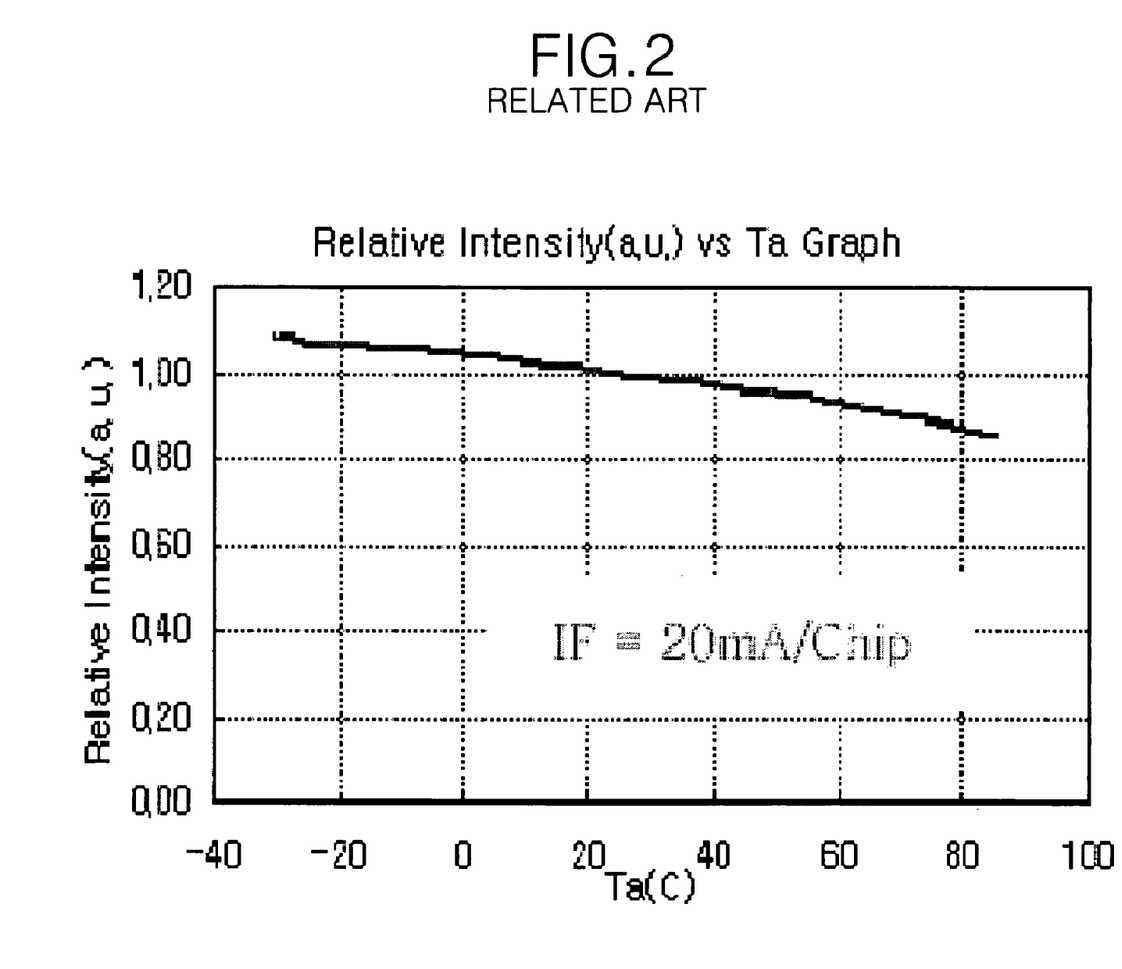
FIG. 2 is a diagram representing a brightness deterioration in accordance with a temperature of a light emitting diode.

Additionally, in case of the liquid crystal display device which uses the CCFL or LED as the light source device, there is generated a problem in that brightness is decreased in accordance with a temperature as shown in FIGS. 1 and 2.

FIG. 1 represents a brightness change of a CCFL in accordance with a temperature, and FIG. 2 represents a brightness change of an LED in accordance with a temperature.

Referring to FIGS. 1 and 2, it is known that the brightness is remarkably deteriorated when a temperature is high or low in the CCFL and when a temperature is high in the LED.

Further, the temperature of the light source has a close relationship with an operation life span to be directly connected to the reliability of the product as well as being a problem of the brightness deterioration.

SUMMARY

Accordingly, it is an objective of the present invention to provide a backlight unit that is adaptive for increasing the brightness uniformity and life span of a light source, and a liquid crystal module using the same.

A backlight unit according to an aspect of the present invention includes a light source and a temperature sensor that senses a temperature of the light source. The backlight unit further comprises a peltier device that increases or decreases the temperature of the light source and a controller that controls the peltier device in correspondence to an output of the temperature sensor.

A liquid crystal module according to another aspect of the present invention includes a backlight unit. The backlight unit includes a light source, a temperature sensor that senses a temperature of the light source, a peltier device that increases or decreases the temperature of the light source and a controller that controls the peltier device in correspondence to an output of the temperature sensor. The liquid crystal module further comprises a liquid crystal display-panel that receives a light irradiated from the backlight unit to realize a picture, a support main within which the backlight unit of the liquid crystal display panel is deposited, a cover bottom that encompasses the bottom and side surfaces of one side of the support main, and a case top that encompasses the edge of the liquid crystal display panel and the cover bottom.

BRIEF DESCRIPTION OF THE DRAWINGS

These and other objectives of the invention will be apparent from the following detailed description of the embodiments of the present invention with reference to the accompanying drawings, in which.

DETAILED DESCRIPTION

Reference will now be made in detail to the preferred embodiments of the present invention, examples of which are illustrated in the accompanying drawings.

With reference to FIGS. 3 to 6, embodiments of the present invention will be explained as follows.

Figure 3:
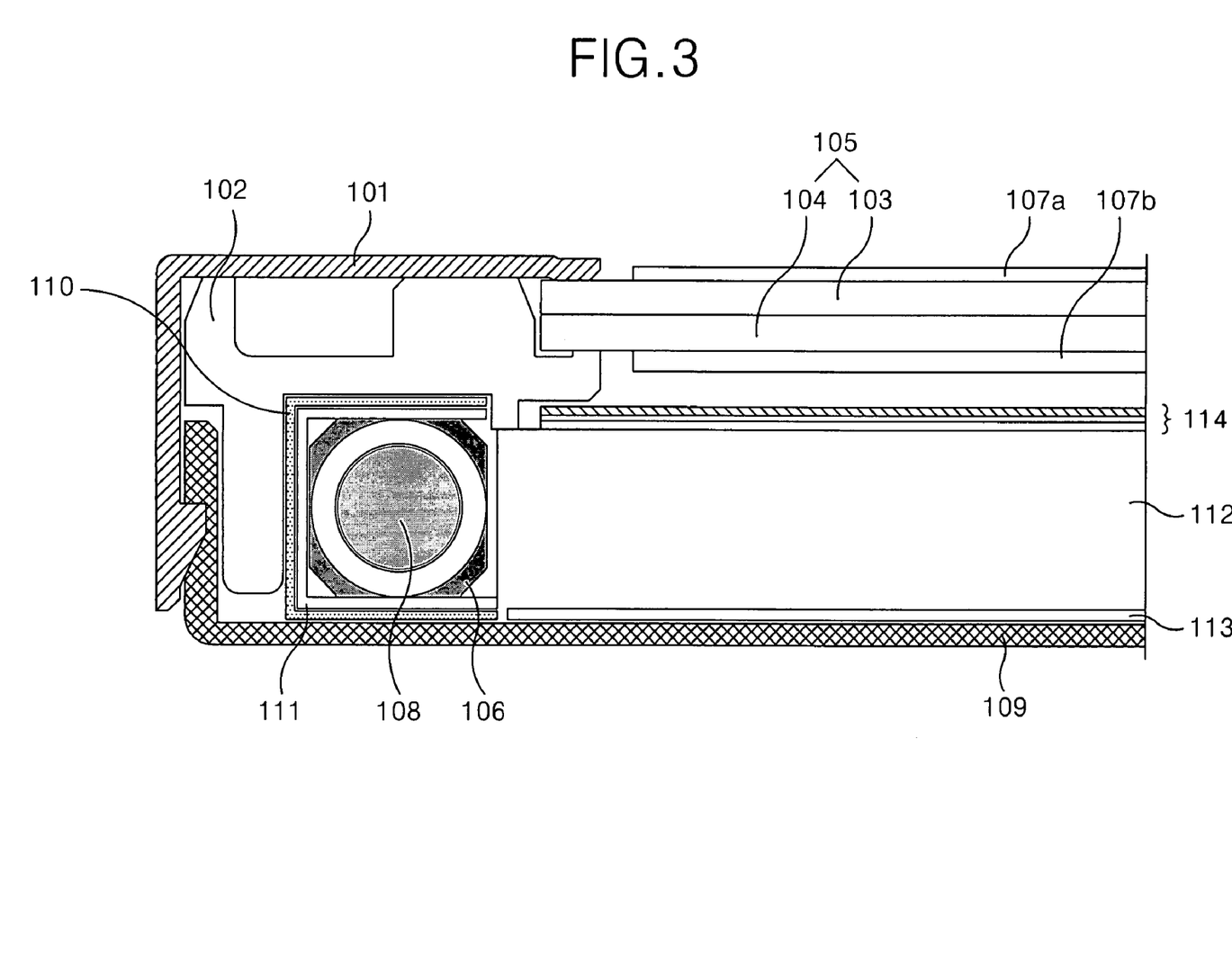
FIG. 3 is a diagram representing a liquid crystal module according to a first embodiment of the present invention.

Referring to FIG. 3, a liquid crystal module according to a first embodiment of the present invention includes a support main 102; a backlight unit and a liquid crystal display panel 105 which are deposited inside the support main 102; a cover bottom 109 which encompasses the bottom and side surfaces of one side of the support main 102; and a case top 101 which encompasses the edge of the liquid crystal display panel 105 and the cover bottom 109.

The support main 102 acts to support the whole of the liquid crystal module and has the backlight unit and the liquid crystal display panel 105 deposited therewithin.

The liquid crystal display panel 105 includes an upper plate 103 where a black matrix, a color filter array, a common electrode and an alignment film are sequentially formed on a substrate; a lower plate 104 where a TFT array, a pixel electrode and an alignment film are sequentially formed on a substrate; an upper polarizer 107a stuck onto the upper plate 103; a lower polarizer 107b stuck under the lower plate 104; a spacer (not shown) for keeping a gap between the upper and lower plates; and a liquid crystal injected into a space between the upper and lower plates 103, 104. And, the upper plate 103 and the lower plate 104 are bonded by a sealant.

The case top 101 is installed to encompass the surface edge and side surface of the optical sheets 114 and the liquid crystal display panel 105. The case top 101 encompasses the edge of the liquid crystal display panel 105 to protect the liquid crystal display panel 105 from an external impact.

The cover bottom 109 is installed to encompass the side surface and the bottom surface of one side of the support main 102. The cover bottom 109 is formed of a metal material, e.g., aluminum.

The backlight unit includes a lamp 108 which generates light; a lamp holder 106 which fixes the lamp 108; a housing 111 installed in a form of encompassing the lamp 108; a peltier device 110 stuck to the housing 111 for controlling the temperature of the lamp 108; a light guide panel 112 for converting the light incident from the lamp 108 into a surface light; a reflection plate 113 located in the lower part of the light guide panel 112 for reflecting the light progressing to the lower and side surfaces of the light guide panel 112 to the upper surface; and optical sheets 114 for controlling the diffusion and progress direction of the light which passes through the light guide panel.

A cold cathode fluorescent lamp is mainly used as the lamp 108 which is used in the backlight unit, and the light generated at the lamp 108 is incident to the light guide panel 112 through the incidence surface of the light guide panel 112.

On the other hand, it is possible to use a light emitting diode, a hot cathode fluorescent lamp, an external electrode fluorescent lamp, etc. as the lamp 108 used in the backlight unit.

The housing 111 has a specular surface in the inner surface thereof to reflect the light from the lamp 108 to the incidence surface of the light guide panel 112.

The reflection plate 113 is installed to face in the rear surface of the light guide panel 112. The light guide panel 112 makes the light incident from the lamp 108 reach a place which is far from the lamp 108. The light guide panel 112 is formed of PMMA (polymethylmethacrylate) which is high in strength so as not to be deformed or broken and is good in transmissivity.

The reflection plate 113 re-reflects the light incident to itself through the rear surface of the light guide panel 112, thereby acting to reduce light loss. The light from the lamp 108 is reflected at a designated tilt angle at the reflection plate 112 of the rear surface to progress uniformly to an exiting surface if the light is incident to the light guide panel 112. At this moment, the light progressing to the lower and side surfaces of the light guide panel 112 is reflected to the light guide panel 112 to progress to the exiting surface.

The light exiting through the exiting surface of the light guide panel 112 has its diffusion and progress direction controlled by the optical sheets 114. To this end, the optical sheets 114 include a diffusion sheet for diffusing the light exiting through the exiting surface of the light guide panel 112 to the whole area; first and second prism sheets for getting the progress angle of the light exiting from the light guide panel to be vertical to the liquid crystal display panel 105; and a protection sheet for protecting the second prism sheet.

The peltier device 110 is formed in a shape of encompassing the part or whole of the external surface of the housing 111 to control a surrounding temperature of the lamp 108.

The peltier device 110 is a circuit device made by use of a peltier effect. The peltier effect is a phenomenon that when a current flows in two different metals of which both cut ends are connected, a temperature difference is generated in the both cut ends, that is to say, emission or decalescence of heat is generated at the joined part of the both cut ends of the two metals. The emission or decalescence of heat at the joined part of the both cut ends of the two metals is reversible in accordance with a direction of a current between two electrodes of the peltier device. The peltier effect and the peltier device using the same has already been known to the public, thus a detail explanation will be omitted.

Figure 4:
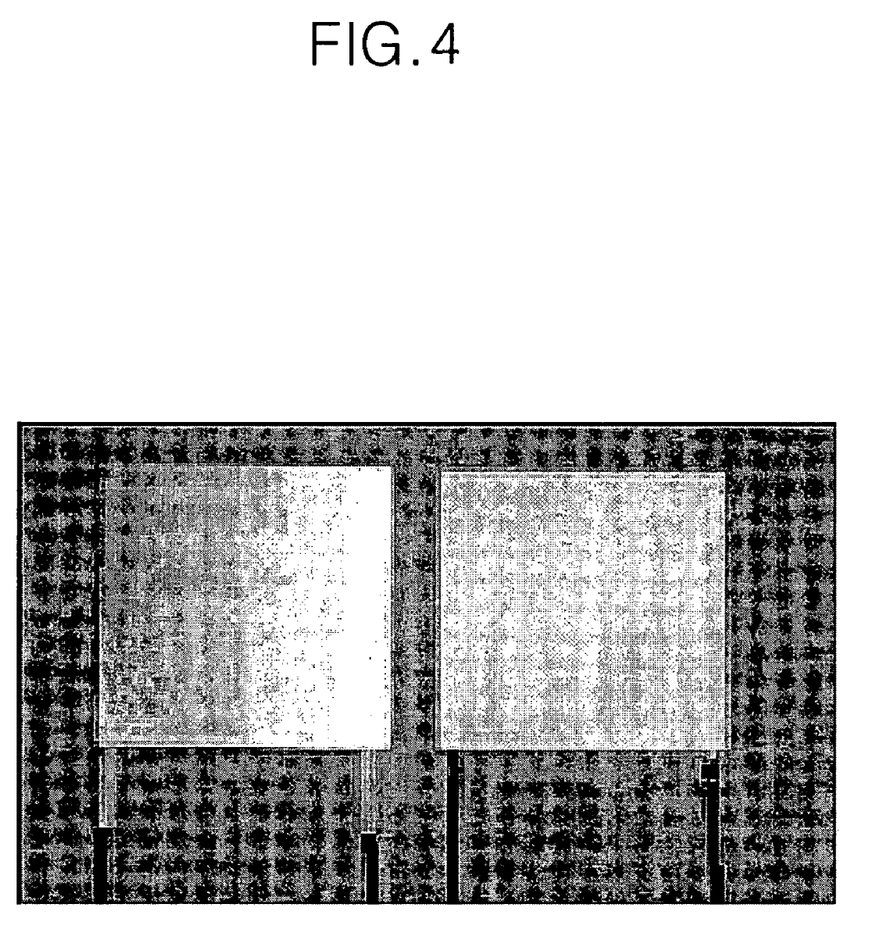
FIG. 4 is a diagram representing a peltier device.

A peltier device using a ceramic substrate is shown in FIG. 4 as an example of the peltier device.

Figure 5:
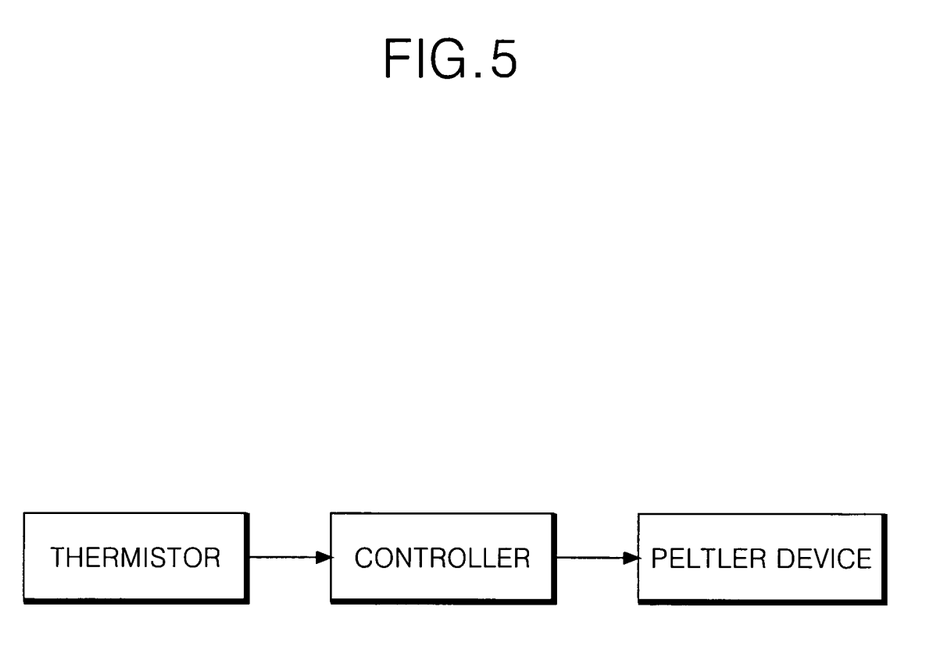
FIG. 5 is a block diagram representing a flow of temperature control.

Referring to FIG. 5, two electrodes of a peltier device 110 are connected to a controller which controls the direction and amount of the current flowing between the two electrodes of the peltier device 110, and an output terminal of a thermistor is connected to the controller.

The thermistor is installed at a location which is suitable for measuring the temperature of the lamp 108, and the output terminal of the thermistor is connected to the controller.

The controller makes a suitable current flow in the peltier device so as for the temperature sensed at the thermistor to be always kept at a fixed level. The temperature of the lamp 108 is suitable to be kept at around 10° C.~70° C., as shown in FIG. 1, in order for the lamp 108 to keep a suitable brightness, and it is desirable for the controller to control the peltier device so that the lamp 108 can keep the temperature. The controller can be mounted on any one of an inverter printed circuit board (hereinafter, referred to as 'PCB'), a source PCB and a gate PCB which are generally embedded in the liquid crystal module.

Figure 6:
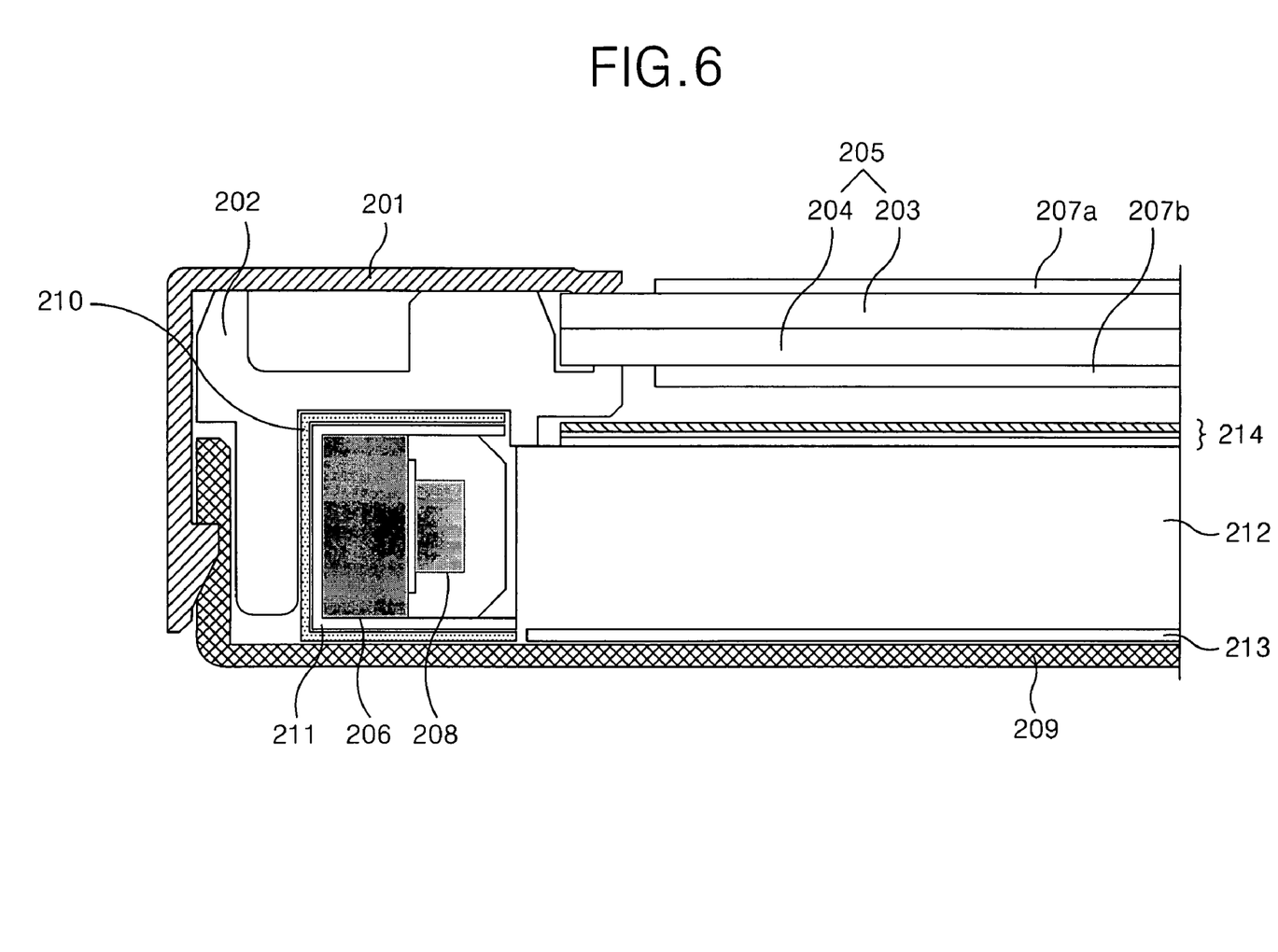
FIG. 6 is a diagram representing a liquid crystal module according to a second embodiment of the present invention.

FIG. 6 represents a liquid crystal module according to a second embodiment of the present invention.

Referring to FIG. 6, the liquid crystal module according to the second embodiment of the present invention includes a support main 202; a backlight unit and a liquid crystal display panel 205 which are deposited inside the support main 202; a cover bottom 209 which encompasses the bottom and side surfaces of one side of the support main 202; and a case top 201 which encompasses the edge of the liquid crystal display panel 205 and the cover bottom 209.

The support main 202 acts to support the whole of the liquid crystal module and has the backlight unit and the liquid crystal display panel 205 deposited therewithin.

The liquid crystal display panel 205 includes an upper plate 203 where a black matrix, a color filter array, a common electrode and an alignment film are sequentially formed on a substrate; a lower plate 204 where a TFT array, a pixel electrode and an alignment film are sequentially formed on a substrate; an upper polarizer 207a stuck onto the upper plate 203; a lower polarizer 207b stuck under the lower plate 204; a spacer (not shown) for keeping a gap between the upper and lower plates; and a liquid crystal injected into a space between the upper and lower plates 203, 204. And, the upper plate 203 and the lower plate 204 are bonded by a sealant.

The case top 201 is installed to encompass the surface edge and side surface of the optical sheets 214 and the liquid crystal display panel 205. The case top 201 encompasses the edge of the liquid crystal display panel 205 to protect the liquid crystal display panel 205 from an external impact.

The cover bottom 209 is installed to encompass the side surface and the bottom surface of one side of the support main 202. The cover bottom 209 is formed of a metal material, e.g., aluminum.

The backlight unit includes a light emitting diode (hereinafter, referred to as 'LED') 208 which generates light; an LED PCB 206 to which the LED 208 is stuck; a housing 211 installed in a form of encompassing the LED unit 208; a peltier device 210 stuck to the housing 211 for controlling the temperature of the LED 208; a light guide panel 212 for converting the light incident from the LED 208 into a surface light; a reflection plate 213 located in the lower part of the light guide panel 212 for reflecting the light progressing to the lower and side surfaces of the light guide panel 212 to the upper surface; and optical sheets 214 for controlling the diffusion and progress direction of the light which passes through the light guide panel.

The LED is a self-luminous device controlled in accordance with the current amount, and the light generated in the LED 208 is incident to the light guide panel 212 through the incidence surface of the light guide panel 212.

The housing 211 has a specular surface in the inner surface thereof to reflect the light from the LED 208 to the incidence surface of the light guide panel 212.

The reflection plate 213 is installed to face in the rear surface of the light guide panel 212. The light guide panel 212 makes the light incident from the LED 208 reach a place which is far from the LED 208. The light guide panel 212 is formed of PMMA (polymethylmethacrylate) which is high in strength so as not to be deformed or broken and is good in transmissivity.

The reflection plate 213 re-reflects the light incident to itself through the rear surface of the light guide panel 212, thereby acting to reduce light loss. The light from the LED 208 is reflected at a designated tilt angle at the reflection plate 213 of the rear surface to progress uniformly to an exiting surface if the light is incident to the light guide panel 212. At this moment, the light progressing to the lower and side surfaces of the light guide panel 212 is reflected to the light guide panel 212 to progress to the exiting surface.

The light exiting through the exiting surface of the light guide panel 212 has its diffusion and progress direction controlled by the optical sheets 214. To this end, the optical sheets 214 include a diffusion sheet for diffusing the light exiting through the exiting surface of the light guide panel 212 to the whole area; first and second prism sheets for getting the progress angle of the light exiting from the light guide panel 212 to be vertical to the liquid crystal display panel 205; and a protection sheet for protecting the second prism sheet.

The peltier device 210 is formed in a shape of encompassing the part or whole of the external surface of the housing 211 to control a surrounding temperature of the LED 208. A description for the peltier device 210 is the same as that of the foregoing first embodiment, thus a detain explanation for this will be omitted.

In the same manner as the first embodiment, two electrodes of a peltier device 210 are connected to a controller which controls the direction and amount of the current flowing between the two electrodes of the peltier device 210, and an output terminal of a thermistor is connected to the controller.

The thermistor is installed at a location which is suitable for measuring the temperature of the LED 208, and the output terminal of the thermistor is connected to the controller.

The controller makes a suitable current flow in the peltier device so as for the temperature sensed at the thermistor to be always kept at a fixed level. The temperature of the LED 208 is suitable to be kept at below 60° C., as shown in FIG. 2, in order for the LED 208 to keep a suitable brightness, and it is desirable for the controller to control the peltier device so that the LED 208 can keep the temperature. The controller can be mounted on any one of an inverter printed circuit board (hereinafter, referred to as 'PCB'), a source PCB and a gate PCB which are generally embedded in the liquid crystal module.

As described above, the temperature of the light source is controlled by use of the peltier device, thus the backlight unit and the liquid crystal module using the same can keep a uniform brightness under the environment of various temperatures and increase the operation life span and reliability.

Although the embodiments above describe backlight unit and liquid crystal module using the same, the present invention is not limited thereto. Other preferred embodiments include frontlight or sidelight unit, and liquid crystal modules using the same.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A backlight unit, comprising:
a light source generating a light;
a light guide panel for converting the light being incident to a side surface into a surface light progressing to a upper surface of the light guide panel;
a reflection plate located at a lower part of the light guide panel that reflects the light; optical sheets for controlling a diffusion and progress direction of the light from the light source and passing through the light guide panel;
a temperature sensor for sensing a temperature of the light source at a location which is suitable for measuring the temperature of the light source;
a housing encompassing the light source except for a part of the light source opposing the side surface of the light guide panel and having a specular surface in the inner surface thereof to reflect the light from the light source to the side surface of the light guide panel;
a peltier device for increasing or decreasing the temperature of the light source and being attached to the whole of the external surface of the housing; and
a controller for controlling the peltier device so as for the temperature sensed at the temperature sensor to be always kept at a fixed level in correspondence to an output of the temperature sensor, wherein the output terminal of the temperature sensor is connected to the controller and the peltier device is connected to the controller
a support main for supporting the backlight unit and a cover bottom for encompassing a bottom and a side surfaces of one side of the support main wherein the peltier device using a ceramic substrate; and,
wherein an internal side surface of the peltier device contacts the external surface of the housing and an external side surface of the peltier device contacts an internal surface of the cover bottom.

2. The backlight unit according to claim 1, wherein the light source comprises a cold cathode fluorescent lamp.

3. The backlight unit according to claim 1, wherein the temperature sensor comprises a thermistor.

4. The backlight unit according to claim 2, wherein the peltier device decreases the temperature of the cold cathode fluorescent lamp if the temperature of the cold cathode fluorescent lamp is higher than a first temperature, and increases the temperature of the cold cathode fluorescent lamp if the temperature of the cold cathode fluorescent lamp is a second temperature lower than the first temperature.

5. The backlight unit according to claim 4, wherein the first temperature is about 70 degrees C. and the second temperature is about 10 degrees C.

6. The backlight unit according to claim 1, further comprising a lamp holder for fixing the light source.

7. The backlight unit according to claim 1, wherein the light source comprises a light emitting diode.

8. The backlight unit according to claim 7, wherein the peltier device decreases the temperature of the light emitting diode if the temperature of the light emitting diode is higher than a predetermined temperature.

9. The backlight unit according to claim 8, wherein the predetermined temperature is about 60 degrees C.

10. The backlight unit according to claim 7, further comprising a lamp holder for fixing the light source.

11. The backlight unit according to claim 1, wherein the light source comprises a hot cathode fluorescent lamp.

12. The backlight unit according to claim 1, wherein the light source comprises an external electrode fluorescent lamp.

13. A liquid crystal module, comprising:
a backlight unit inclusive of a light source generating a light, a light guide panel for converting the light being incident to a side surface into a surface light progressing to a upper surface of the light guide panel, a reflection plate located at a lower part of the light guide panel that reflects the light, optical sheets for controlling a diffusion and progress direction of the light from the light source and passing through the light guide panel, a temperature sensor for sensing a temperature of the light source at a location which is suitable for measuring the temperature of the light source, a housing encompassing the light source except for a part of the light source opposing the side surface of the light guide panel and having a specular surface in the inner surface thereof to reflect the light from the light source to the side surface of the light guide panel, a peltier device for increasing or decreasing the temperature of the light source and being attached to the whole of the external surface of the housing and a controller for controlling the peltier device so as for the temperature sensed at the temperature sensor to be always kept at a fixed level in correspondence to an output of the temperature sensor, wherein the output terminal of the temperature sensor is connected to the controller and the peltier device is connected to the controller;
a liquid crystal display panel for receiving a light irradiated from the backlight unit to realize a picture;
a support main for supporting the backlight unit of the liquid crystal display panel therein
a cover bottom for encompassing a bottom and a side surfaces of one side of the support main; and
a case top for encompassing an edge of the liquid crystal display panel and the cover bottom,
wherein the peltier device using a ceramic substrate; and
wherein an internal side surface of the peltier device contacts the external surface of the housing and an external side surface of the peltier device contacts an internal surface of the cover bottom.

14. The liquid crystal module according to claim 13, wherein the light source comprises a cold cathode fluorescent lamp.

15. The liquid crystal module according to claim 13, wherein the temperature sensor comprises a thermistor.

16. The liquid crystal module according to claim 14, wherein the peltier device decreases the temperature of the cold cathode fluorescent lamp if the temperature of the cold cathode fluorescent lamp is higher than a first temperature, and increases the temperature of the cold cathode fluorescent lamp if the temperature of the cold cathode fluorescent lamp is a second temperature lower than the first temperature.

17. The liquid crystal module according to claim 16, wherein the first temperature is about 70 degrees C. and the second temperature is about 10 degrees C.

18. The liquid crystal module according to claim 13, further comprising a lamp holder for fixing the light source.

19. The liquid crystal module according to claim 13, wherein the light source comprises a light emitting diode.

20. The liquid crystal module according to claim 19, wherein the peltier device decreases the temperature of the light emitting diode if the temperature of the light emitting diode is higher than a predetermined temperature.

21. The liquid crystal module according to claim 20, wherein the predetermined temperature is about 60 degrees C.

22. The liquid crystal module according to claim 19, further comprising a lamp holder for fixing the light source.

23. The liquid crystal module according to claim 13, wherein the light source comprises a hot cathode fluorescent lamp.

24. The liquid crystal module according to claim 13, wherein the light source comprises an external electrode fluorescent lamp.

* * * * *